United States Patent [19]
Owens et al.

[11] Patent Number: 5,293,290
[45] Date of Patent: Mar. 8, 1994

[54] STACKABLE LINEAR ACTUATOR USING EMBEDDED COIL CARRIAGES

[75] Inventors: Kenneth R. Owens, Longmont; Robert D. Stroud; Lester M. Yeakley, both of Boulder, Colo.

[73] Assignee: Storage Technology Corporation, Louisville, Colo.

[21] Appl. No.: 777,799

[22] Filed: Oct. 17, 1991

[51] Int. Cl.⁵ .............................................. F11B 5/55
[52] U.S. Cl. .................................................. 360/106
[58] Field of Search ...................................... 360/106

[56] References Cited

U.S. PATENT DOCUMENTS

| | | | |
|---|---|---|---|
| 4,331,990 | 5/1982 | Frandsen | 360/106 |
| 4,506,307 | 3/1985 | Watrous | 360/106 |
| 4,612,592 | 9/1986 | Frandsen | 360/106 |
| 4,620,253 | 10/1986 | Garwin et al. | 360/107 |
| 4,669,013 | 5/1987 | Scranton et al. | 360/106 |
| 4,967,293 | 10/1990 | Aruga et al. | 360/106 |
| 5,067,037 | 11/1991 | Anath et al. | 360/103 |
| 5,134,532 | 7/1992 | Svendsen et al. | 360/106 |

Primary Examiner—Edward P. Westin
Assistant Examiner—Andrew Sanders
Attorney, Agent, or Firm—Duft, Graziano & Forest

[57] ABSTRACT

A stackable linear actuator using flat, planar carriages. Each carriage is formed of two thin fiber reinforced outer surfaces having a low density composite core between each of the outer surfaces. A flat single layer coil is mounted within the composite core. The carriages are mounted for relative movement in a vertical stack. Between each carriage is a set of permanent magnets of opposing polarity. The sets of magnets are aligned so that magnets of similar polarity are aligned vertically. A steel plate is attached at the top of the stack. Another steel plate is attached to the bottom of the stack. These plates shunt the magnetic flux to form a continuous loop of magnetic flux through the entire stack. The carriages are operated by supplying the coils with current of varying intensity and polarity.

20 Claims, 3 Drawing Sheets 5,293,290

STACKABLE LINEAR ACTUATOR USING EMBEDDED COIL CARRIAGES

BACKGROUND OF THE INVENTION

1. Field of the Invention

The present invention relates to the field of linear actuators for use in magnetic disk storage systems.

2. Statement of the Problem

The performance of magnetic disk drives is limited by actuator access time and actuator contention as well as by other factors. Actuator access time is the amount of time required for an actuator carrying a read/write head to move to proper position on a disk. This is constrained by the acceleration of the actuator, the mass of the actuator, friction between the actuator and its surrounding structure, the power capability of the actuator, and the distance the actuator must travel.

Actuator contention is dependent upon the availability of a particular actuator to access a particular random disk track.

Typically, read/write heads in disk drives are mounted on an arm supported by a carriage which is reciprocated by voice coil motor. The actuators usually comprise a movable carriage which is driven by an electric coil positioned in a magnetic field and operated by variable intensity and variable polarity current. This system requires considerable power to overcome the inertia of the relatively high mass of the carriage as well as inefficiencies of the linear motor. Further, these systems normally encounter friction in moving the actuator.

These actuators typically use a single actuator to move multiple read/write heads into position. This requires movement of a relatively large mass, as well as creating a problem with actuator contention. There have been various attempts to address these problems in the past.

U.S. Pat. No. 4,331,990, issued to Frandsen, discloses the use of a plurality of actuators. Each actuator has a flat wire loop mounted on top of a planar carriage frame which is mounted on roller bearings to reduce the mass and the inefficiencies of the voice oil motor system. This system still requires considerable spacing between the carriages, thus increasing the overall size and mass of the system, as well as contributing to inefficiencies in the magnetic flux. Roller bearings support the carriages which further adds mass and friction in the system.

U.S. Pat. No. 4,506,307, issued to Watrous, discloses an actuator using air bearings on portions of eight of the surfaces of an X-shaped structure of the actuator to reduce the mass of the system. The air bearings must be externally supplied by a blower.

U.S. Pat. No. 4,620,253, issued to Garwin et al., discloses an actuator using flat linear coils mounted on top of the carriage to reduce the size and mass of the carriage to increase the performance of the system.

There presently exists a need for an actuator having a rapid access time as well as reducing the overall size of the system and solving the problem of actuator contention.

3. Solution of the Problem

The present invention solves these and other problems by providing a high performance disk drive having a plurality of single arm actuators.

The present invention provides a low mass, low profile actuator having a high efficiency and extremely low friction.

The present invention provides a system where multiple actuators may easily be stacked at the normal disk spacing with as many carriages as desired.

SUMMARY OF THE INVENTION

The present invention provides stackable linear actuators using flat planar carriages. Each of the planar carriages are formed of two thin fiber reinforced outer surfaces having a low density composite core between each of the outer surfaces. A flat single layer coil is mounted within the composite core.

The carriages are mounted for relative linear movement in a vertical stack. A set of permanent magnets is mounted between the carriages and at each end of the stack. Each set of magnets include magnets of opposing polarity. The sets of magnets are mounted so that magnets of similar polarity are aligned vertically. A steel plate is attached at the top of the stack and a steel plate is attached to the bottom of the stack. These plates shunt the magnetic flux to form a continuous loop of magnetic flux through the entire stack.

The carriages are supported by low profile, low mass bearings, for example air bearings and rolling flexure bearings. The carriages are operated by driving the coils with current of varying intensity and polarity.

The planar carriages form a low mass, low profile, high efficiency actuator. These and other features will become evident from the description of the preferred embodiment taken in conjunction with the drawings.

DESCRIPTION OF THE PREFERRED EMBODIMENT

Figure 1:
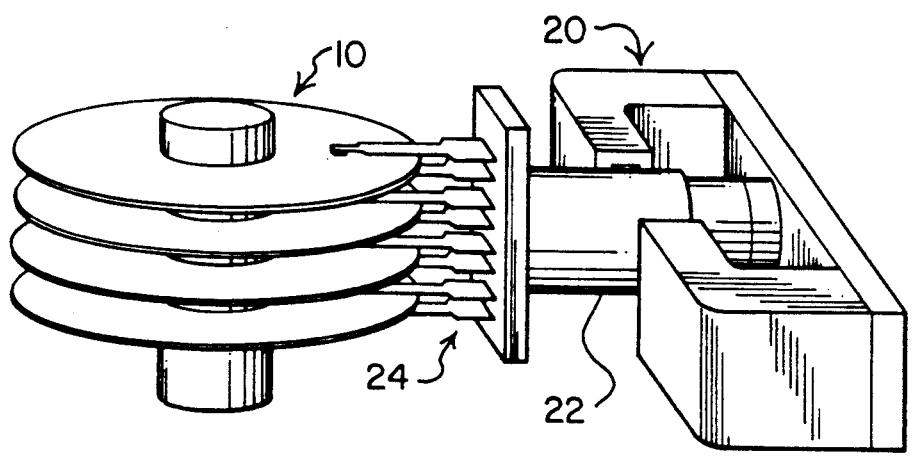
FIG. 1 shows a prior art actuator with multiple head arm assemblies.

One type of prior art actuator assembly for a magnetic data disk storage device is shown in FIG. 1. This device uses a linear motor 20 to move carriage 22 linearly. Multiple head arm assemblies 24 mounted on single carriage 22 are moved relative to disks 10. This type of system requires a large force to move the relatively high mass of the carriage and head arm assemblies mounted thereon. A single head arm assembly 24 with its corresponding read/write head can not be positioned without moving the entire carriage 22 and multiple head arm assemblies 24. The acceleration of the large mass is low and the read/write contention is relatively high. Therefore the overall performance is relatively low.

Figure 2:
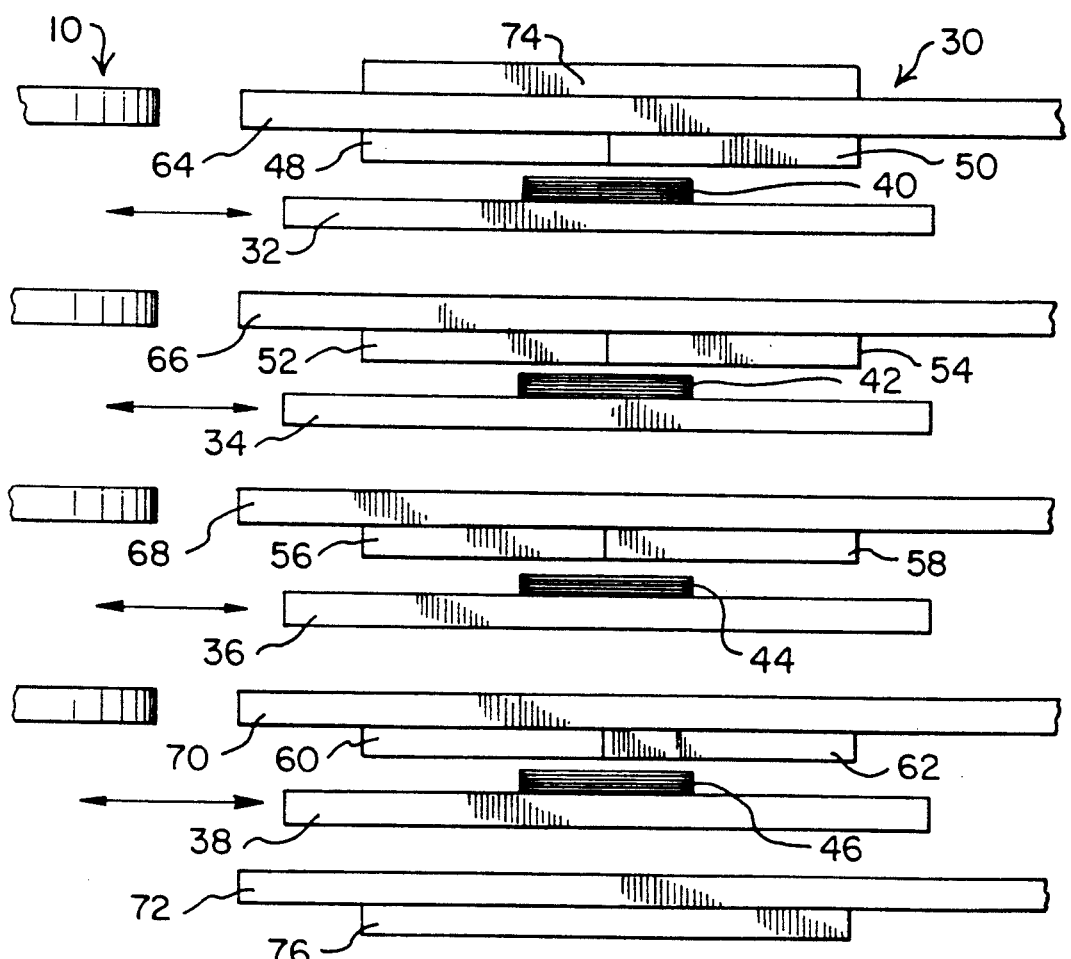
FIG. 2 shows a cutaway view of a prior art multiple single arm actuators.
Figure 3:
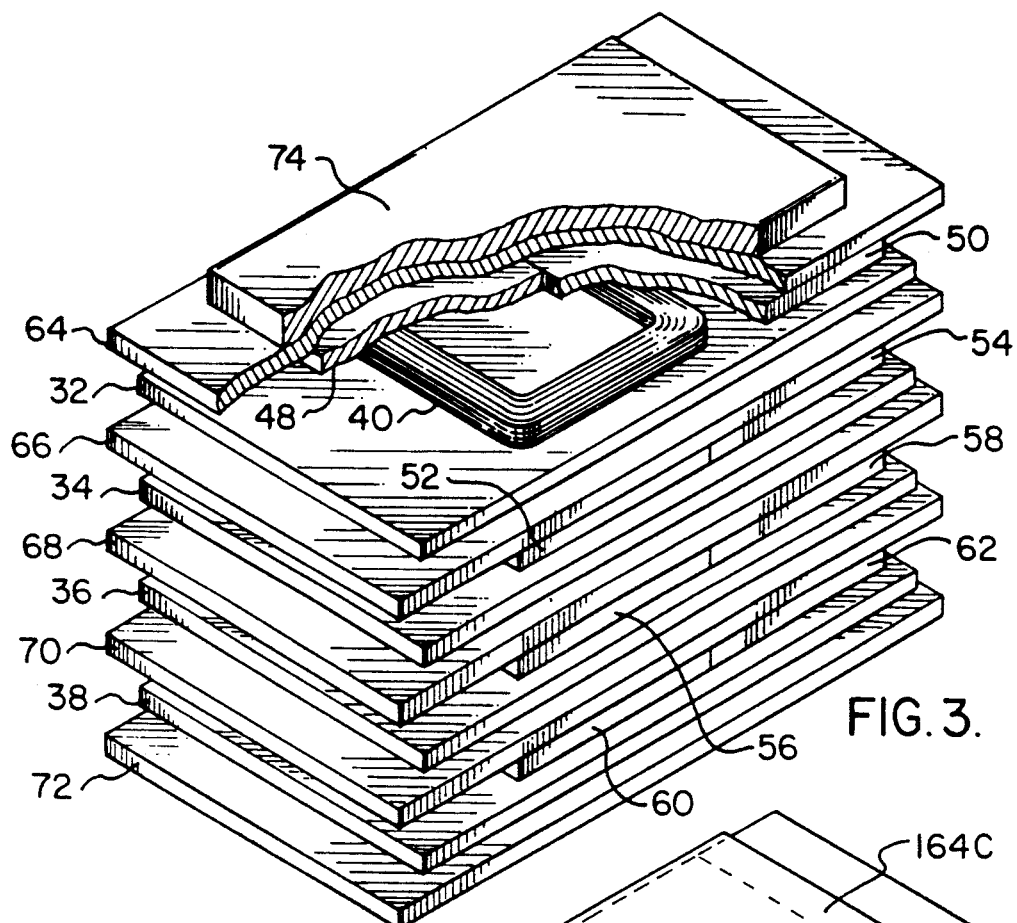
FIG. 3 shows a perspective view of FIG. 2.

FIGS. 2 and 3 illustrate another type of magnetic data storage disk system. This system 30 uses multiple carriages 32, 34, 36, 38 which are individually movable relative to disks 10. This type of system has a much lower contention rate. Coils 40, 42, 44, 46 are mounted on the top surface of the respective carriages 32–38. Sets of magnets 48, 50; 52, 54; 56, 58; and 60, 62 are mounted on support structures 64, 66, 68, 70 adjacent the respective coils 40-46. Each set of magnets 48-62 includes adjacent magnets having opposing polarity. The magnets are mounted so that magnets having similar polarity are aligned vertically. This allows the magnetic flux to flow from the vertically aligned magnets through coils 40-46 and to the next magnet within the vertically align row. Top base plate 74 and bottom base plate 76 shunt the magnetic flux from the aligned rows of magnets to the next vertically aligned row of magnets of opposing polarity to form a continuous loop through the system. This creates a voice coil mechanism to individually move the carriages as a drive current of differing magnitude and polarity is applied to each carriage. This system is still relatively bulky and requires ball bearings (not shown) to support the carriages for relative movement. The friction of the bearings and the overall size and mass still creates an carriage system with slower performance than might be desired.

Figure 5:
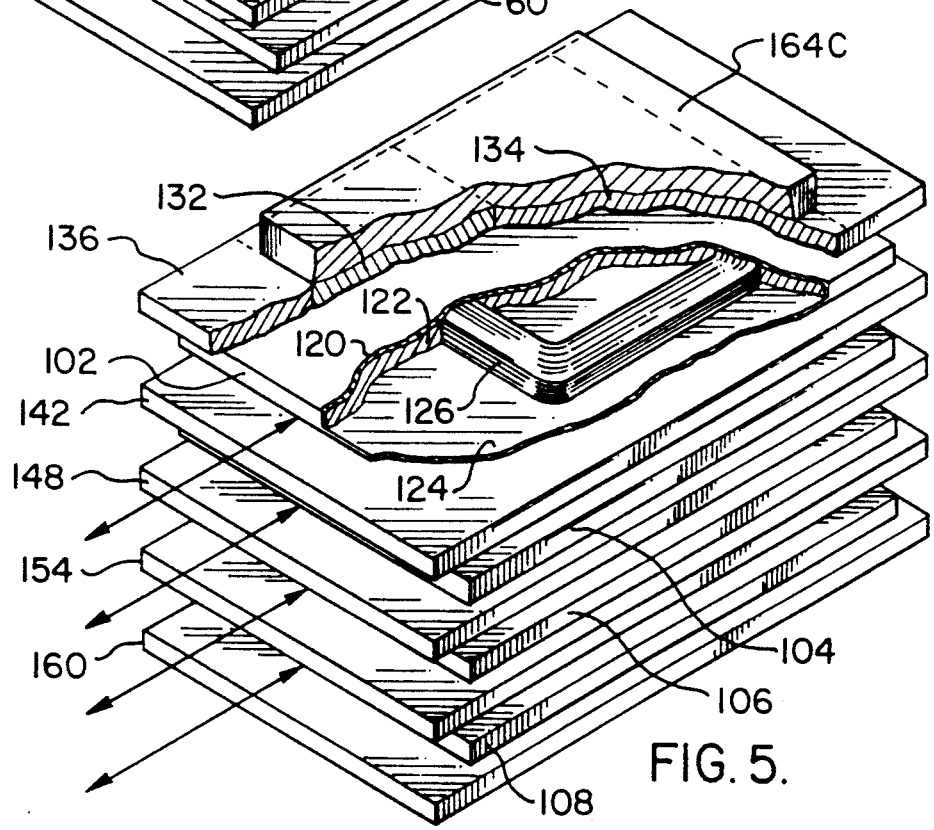
FIG. 5 shows a perspective view of the actuator assembly of the present invention.
Figure 4:
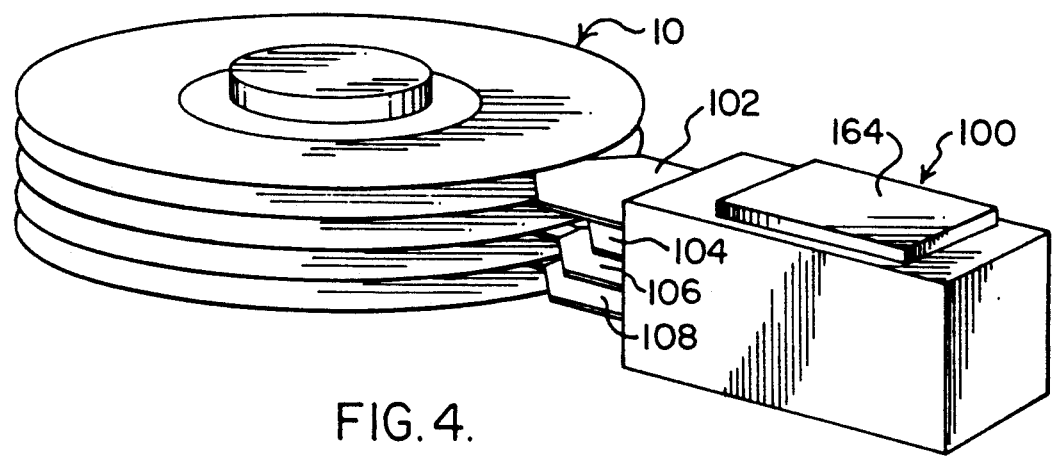
FIG. 4 shows an overall perspective view of the present invention.
Figure 6:
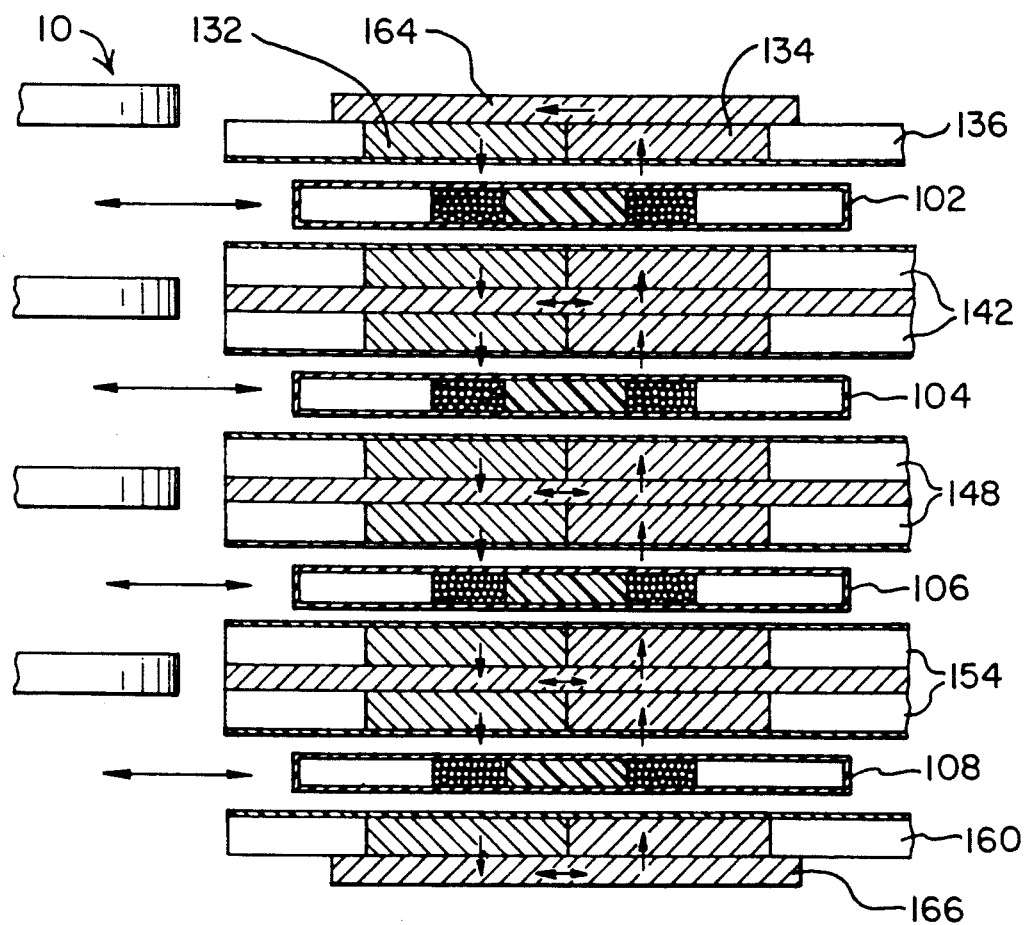
FIG. 6 shows a side view of FIG. 5.

A preferred embodiment of the present invention is illustrated in FIGS. 4-6. The multiple actuator stack 100 comprises a series of vertically stacked carriages 102, 104, 106, 108. The carriages are all similar in design. Each carriage carries at least one read/write head (not shown) to read and record data on the disks 10.

Each of the carriages, as shown in FIG. 5, includes an upper outer surface 120 formed of a thin, fiber reinforced material and a lower outer surface 124 formed of a thin, fiber reinforced material. These outer surfaces form a sandwich around a low density, composite core 122. Within the inner core 122 is a single layer, flat coil 126 formed from aluminum ribbon wire. Coil 126 is formed from multiple turns of wire wound to form a flat, square shaped coil. The size of the wire and the number of turns is determined by the output characteristics of the power amplifier which will drive the coil.

The inner core 122 itself is formed from a fiber and hollow glass sphere reinforced epoxy. The core material is chosen to match the thermal expansion coefficient of expansion of the aluminum coil 126. One embodiment of the core material uses glass micro-balloons with chopped fiberglass to minimize shrinkage and lower the thermal coefficient of expansion of the core. This embodiment uses a standard epoxy resin as a high temperature curing agent with an aromatic catalyst. Other variations include using carbon fiber in lieu of chopped fiberglass. The carbon fiber has a higher strength to weight ratio. The use of a carbon fiber laminate is also contemplated. Other variations include the use of phenolic resins to provide a lower density, higher strength structure. Also the use of epoxy agents having extra low viscosity, such as ECCOSEAL 1207 available from commercial suppliers provides a more versatile composite, especially in combination with phenolic resins. Another embodiment of the present invention contemplates the use of a latent epoxy resin used with an accelerator curing agent. This will allow the use of a latent cure B stage which greatly speeds the time needed for curing. Also contemplated is the use of a blowing agent to create a gaseous product instead using glass micro-balloons. Other variations are considered to be within the scope of the inventive concept. These variations include but are not limited to the use of honeycomb cores, the use of polyurethane resins and the use of vacuum impregnation to form a rigid structure.

In the described preferred embodiment, the carriages are each 0.050 inches thick, 2.00 inch wide and 4.2 inches long. The total moving mass of a single carriage having two read/write heads mounted on it and having a 1.15 inch stroke is about ten grams.

It is to be expressly understood that this description is of a preferred embodiment to explain the invention and is not meant to limit the invention to only this embodiment. Other variations are considered to be within the scope of the inventive concept.

Current is supplied to the coils 126 by directly attaching leads to the coils.

The carriages 102-108 are adapted to be supported for relative movement by bearings having low mass and low profile as described in the related co-pending application Ser. No. 07/782,584 to A. Gorove et al. filed Oct. 25, 1991 as well as in U.S. Pat. No. 5,149,222 to Yeakley of Sep. 22, 1992.

The system has support structures 136, 142, 148, 154, 160 spaced between the carriages 102-108, respectively. The support structures 136-160 each include thin metal sheets 172 opposing the embedded coils 126 of each of the carriages 102-108 to act as shorted turns for the linear motor, thus reducing the inductance value of the coils 126. This increases the rise time of the current through the coils and increases the performance of the actuators. As illustrated in FIG. 6, sets of permanent magnets 132, 134; 138, 140; 138', 140'; 144, 146; 144', 146'; 150, 152; 150', 152'; 156, 158 are mounted within support structures 136, 142, 148, 154, 160. Each set of magnets include magnets of opposing polarity mounted adjacent. Low carbon steel plates 172 are mounted between adjacent magnet sets 138, 140; and 138', 140; sets 144, 146; and 144', 148'; and sets 150, 152; and 150', 152'. Plates 172 form shunts for the magnetic flux as discussed below. Mounting the magnets and plates within the support structures 136, 142, 148, 154, 160 forms a low profile structure. Also mounting each of the magnets within the inner support structures 142, 148, 154 allows the magnets to act on the linear coils 126 embedded within the carriages above and below the magnets. Each coil 126 has two sets of the magnets acting on it, thereby each of the magnets can have a smaller thickness, reducing the overall spacing by an even greater amount.

The sets of magnets 132-158 are mounted so that magnets of similar polarity are aligned vertically as illustrated in FIG. 6. This causes the magnetic flux from each magnet to flow through the coils and through the next vertically aligned magnet. An upper plate 164, formed of steel or another ferritic material is mounted on the top of the stackable linear motor to shunt the magnetic flux from one aligned vertical row of magnets to the adjacent vertical row of magnets of opposing polarity. Similarly, a lower plate 166 formed of low carbon steel or another ferritic material is mounted on the bottom of the stack to shunt the magnetic flux through the rows of magnets. This creates a continuous loop of magnetic flux through the adjacent rows of magnets as indicated by the arrows in FIG. 6. Shunt plates 172 provide for magnetic isolation between actuators. Also, should one or more magnets become weaker or overpowered, the adjacent magnets will be able to enhance the local performance by compensating through increased local magnetic flux.

The rows of magnets are mounted relative to the carriages so that by varying the magnitude and the polarity of the current supplied to the coils 126 mounted within the carriages, the coils are forced toward or away from the disk 10 by the interaction of the applied current and the magnetic field produced by the magnets. The forcing of the coils causes carriages 102-108 to move relative to the support structure. This positions the read/write heads (not shown) mounted on the carriages relative to the disks 10.

The force generated on the coils 126 is directly dependent upon the number of wire turns in the coils 126, the magnitude of the current and the strength of the magnetic field.

The placement of the magnets within the support structure and the embedding of the coils within the carriages decreases the spacing required between the carriages and the magnets. This reduces the amount of the magnetic flux that travels unused through open air, thus increasing the efficiency of the magnetic circuit. This in turn allows a reduction in the size of the magnetics and thus the overall stack height of the actuators. Use of high energy product magnets such as Neodenium-Iron-Boron also reduces the stack height.

The placement of the magnets within the support structure and the embedding of the coils within the carriages also provides a smooth planar surface on the carriages and on the support structures. This allows the use of air bearings or other low profile, low mass, low friction bearings to guide and support the carriages for linear movement.

Therefore, by providing a low mass carriage using low friction bearing supports, with a low profile spacing between the magnets and the coils, the response time of the actuator can be decreased, thus increasing the performance of the system.

The design of the planar carriages with low profile support and magnetic structures allows the carriages to be easily stacked on top of one another in a modular system. The linear motor can be easily adapted to accommodate any desired number of carriages.

The claimed invention is not meant to be limited to the description of the preferred embodiment but contemplates other variations and modifications within the scope of the inventive concept.

I claim:

1. A stackable linear actuator having at least one carriage, said actuator comprising:
    a structure comprising a plurality of plates stacked one on top of another, each of said plates having a substantially planar upper and lower surface;
    said plates being positioned substantially parallel to each other to maintain a gap between adjacent ones of said plates for receiving one of said at least one carriage;
    bearing means for supporting each of said at least one carriage for movement of said carriage within said gap and parallel to said planar upper and lower surfaces of said plates;
    moving means comprising a part of each of said at least one carriage to individually move each of said at least one carriage in a linear path parallel to said planar upper and lower surfaces of said plates; and
    each of said at least one carriage and said moving means comprising a single thin structure having substantially planar upper and lower surfaces.

2. The actuator of claim 1 wherein said moving means include a conductive coil embedded within each of said at least one planar carriage; said coil being adapted to receive currents of differing magnitude and polarity.

3. The actuator of claim 2 wherein said actuator includes magnets each having a plus and minus pole and each being embedded within said plates near each of said at least one carriage to provide magnetic flux through each said coil to controllably move each of said at least one carriage as said currents flow through each said coil.

4. The actuator of claim 3 wherein a first set of said magnets is embedded within said plates and is spaced above each of said at least one carriage and a second set of said magnets is embedded within said plates and is spaced below each of said at least one carriage, both of said sets being aligned so said first set and said second set of said magnets provide magnetic flux through said coil embedded within each of said at least one carriage.

5. The actuator of claim 4 wherein a plurality of said carriages and said plates are positioned vertically with respect to one another to form a stack;
    said sets of magnets embedded within said plates being aligned in vertical columns so that in one aligned vertical column each of said magnets has its plus pole directed up and in another aligned vertical column each of said magnets has its minus pole directed up;
    means attached to the top of said stack for shunting said magnetic flux between said aligned columns of magnets, and means attached to the bottom of said stack for shunting said magnetic flux between said aligned columns of magnets; and
    said magnets and said shunting means forming a continuous loop of said magnetic flux through said magnets and said coils.

6. The actuator of claim 1 wherein each of said at least one carriage comprises two thin fiber reinforced outer surfaces and a low density composite core between said outer surfaces; and
    said moving means include a conductive coil embedded in each of said cores between said outer surfaces and adapted to receive controllable currents of differing magnitudes and polarity through said coil.

7. The actuator of claim 6 wherein said actuator includes a set of magnets each having a plus and minus pole and each being embedded within said plates near each of said at least one carriage for providing magnetic flux through each of said coils to move each of said at least one carriage as said controllable currents flow through each of said coils.

8. The actuator of claim 7 wherein a first set of said magnets is embedded within said plates and spaced above each of said at least one carriage and a second set of said magnets is embedded within said plates and spaced below each of said at least one carriage; and
    both of said sets of magnets being aligned so said first set and said second set of said magnets provide magnetic flux through said coil embedded within each of said at least one carriage.

9. The actuator of claim 8 wherein a plurality of said carriages and said plates are positioned vertically with respect to one another to form a stack;
    said sets of magnets embedded within said plates being aligned in vertical columns so that in one aligned vertical column each of said magnets has its plus pole directed up and in another aligned vertical column each of said magnets has its minus pole directed up;
    means attached to the top of said stack for shunting said magnetic flux between said aligned columns of magnets, and means attached to the bottom of said stack for shunting said magnetic flux between said aligned columns of magnets; and said magnets and said shunting means forming a continuous loop of said magnetic flux through said magnets and said coils.

10. A linear actuator system for controllably moving read/write heads in a magnetic disk drive system, said actuator comprising:
a plurality of plates;
a carriage positioned to slide between two adjacent ones of said plates and parallel to the opposing surfaces of said adjacent plates;
said carriage having substantially planar upper and lower surfaces;
means embedded within said carriage to controllably move said carriage; and
bearing means for supporting said carriage in a plane perpendicular to said opposing surfaces of said adjacent plates as said carriage slides parallel to said opposing surfaces of said plates.

11. The actuator of claim 10 wherein said moving means comprise a conductive coil embedded within said carriage adapted to receive controllable currents of differing magnitude and polarity through said coil.

12. The actuator of claim 11 wherein said actuator further includes magnets each having a plus and minus pole and each being embedded within said plates and positioned adjacent to said carriage for providing magnetic flux through said coil to move said carriage as said current flows through said coil.

13. The actuator of claim 11 wherein said actuator includes a first set of magnets positioned adjacent the top surface of said carriage and a second set of magnets positioned adjacent the bottom surface of said carriage; and
said sets of magnets positioned so both sets of said magnets provide magnetic flux through said coil.

14. The actuator of claim 13 wherein a plurality of said carriages and said plates are positioned vertically with respect to one another to form a stack;
said sets of magnets being aligned so that in one aligned vertical column each of said magnets has its plus pole directed up an in another aligned vertical column each of said magnets has its minus pole directed up;
means positioned on top of said stack for shunting said magnetic flux between said aligned columns of magnets, and means positioned beneath said stack for shunting said magnetic flux between said aligned columns of magnets; and
said magnets and said shunting means forming a continuous loop of magnetic flux through said sets of magnets and said coils.

15. A method of forming a linear actuator having at least one linearly moving carriage, said method comprising the steps of:
forming each of said at least one carriage with a conductive coil embedded between two thin fiber reinforced outer surfaces to form a thin planar structure;
slidably positioning each of said at least one carriage between sets of magnets set of magnets includes magnets of opposing polarity each having a plus pole and a minus pole; and
controllably supplying current of differing polarity and magnitudes to move each of said at least one carriage relative to said magnets parallel to the plane of said outer surfaces of said at least one carriage.

16. The method of claim 15 further including the steps of:
positioning said sets of magnets in vertically aligned columns so that magnets having their plus pole directed upward are vertically aligned in one column, and magnets having their minus pole directed upward are vertically in another column to allow the magnetic flux to flow through said magnets and said coils;
positioning a first plate to the top of said vertically aligned rows to shunt said magnetic flux from one vertically aligned row of magnets to the adjacent vertically aligned row of magnets of opposing polarization; and
positioning a second plate to the bottom of said vertically aligned rows to shunt said magnetic flux from one vertically aligned row of magnets to the adjacent vertically aligned row of magnets of opposing polarization to form a continuous loop of magnetic flux.

17. The method of claim 16 wherein said method further comprises the steps of:
embedding said sets of magnets within a support structure adapted to slidably receive said carriages.

18. A stackable linear actuator comprising:
carriage means for controllably moving read/write heads radially across disk surfaces, said carriage means having substantially smooth planar upper and lower surfaces;
support means substantially parallel to and adapted to slidably receive said carriage means, said support means having substantially smooth planar surfaces where it receives said carriage means;
conductive coil means embedded within said carriage means adapted to receive electric current of controllable magnitude and polarity; and
magnet means embedded within said support means for creating a magnetic flux field to move said carriage means as said current is controllably applied to said conductive coil means.

19. The actuator of claim 18 further comprising:
a plurality of said carriage means;
a plurality of said support means; and
said plurality of said support means and said plurality of said carriage means being vertically positioned on top of one another to form a stack of said actuators.

20. The actuator of claim 19 wherein said magnet means further comprise:
pairs of magnets, a first magnet of each of said pairs having it plus pole directed upward, and the second magnet of each of said pairs having its minus pole directed upward;
each of said first magnet of a pair being vertically aligned in a column with other similarly oriented ones of said magnets;
each of said second magnet of a pair being vertically aligned in a column with other similarly oriented ones of said magnets; and
means attached to the top and bottom of said stack of actuators for shunting said magnetic flux field between said vertically aligned columns of magnets to form a continuous loop of said magnetic flux through said carriage means.

* * * * *